US012618992B2

(12) United States Patent
Kazei et al.

(10) Patent No.: US 12,618,992 B2
(45) Date of Patent: May 5, 2026

(54) DAS DEPTH CALIBRATION WITH MULTI-GAUGE LENGTH INTERROGATION

(71) Applicant: ARAMCO SERVICES COMPANY, Houston, TX (US)

(72) Inventors: Vladimir Kazei, Houston, TX (US); Aleksei Titov, Golden, CO (US); Andrey Bakulin, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 400 days.

(21) Appl. No.: 18/343,668

(22) Filed: Jun. 28, 2023

(65) Prior Publication Data

US 2025/0004153 A1      Jan. 2, 2025

(51) Int. Cl.
| | |
|---|---|
| *G01V 1/22* | (2006.01) |
| *E21B 7/04* | (2006.01) |
| *E21B 44/00* | (2006.01) |
| *E21B 49/00* | (2006.01) |
| *G01V 1/50* | (2006.01) |

(52) U.S. Cl.
CPC ................ *G01V 1/226* (2013.01); *E21B 7/04* (2013.01); *E21B 44/00* (2013.01); *E21B 49/00* (2013.01); *G01V 1/50* (2013.01)

(58) Field of Classification Search
None
See application file for complete search history.

(56) References Cited

U.S. PATENT DOCUMENTS

| | | | | | |
|---|---|---|---|---|---|
| 4,312,040 | A | * | 1/1982 | Tinch | G01V 11/00 |
| | | | | | 702/6 |
| 4,794,573 | A | * | 12/1988 | Bell | G01V 1/42 |
| | | | | | 367/57 |
| 6,131,694 | A | * | 10/2000 | Robbins | G01V 1/282 |
| | | | | | 181/103 |
| 9,250,112 | B2 | | 2/2016 | Godfrey | |
| 10,393,921 | B2 | | 8/2019 | Cuny et al. | |

(Continued)

OTHER PUBLICATIONS

Titov A, Kazei V, AlDawood A, Alfataierge E, Bakulin A, Osypov K. Quantification of DAS VSP Quality: SNR vs. Log-Based Metrics. Sensors. 2022; 22(3):1027. https://doi.org/10.3390/s22031027 (Year: 2022).*

(Continued)

*Primary Examiner* — Lina Cordero
(74) *Attorney, Agent, or Firm* — Osha Bergman Watanabe & Burton LLP

(57)      ABSTRACT

Systems and methods are presented for determining a calibrated vertical seismic profile (VSP) with a distributed acoustic sensing (DAS) system in a borehole. The methods include obtaining a density log and an acoustic slowness log for the borehole; determining a first impedance, a DAS impedance from well log (DIL) curve, from the density log and the acoustic slowness log; obtaining a VSP dataset in the borehole; for each of the plurality of gauge lengths: determining a second impedance, a DAS from vibrations (DIV) curve, from the VSP dataset for the plurality of gauge lengths, and determining a fit between the DIV curves and the DIL curve by using a misfit functional for each of a plurality of depth adjustments. The method further includes determining the calibrated VSP by applying a preferred depth adjustment to the VSP dataset.

11 Claims, 8 Drawing Sheets

(56) References Cited

U.S. PATENT DOCUMENTS

| | | | |
|---|---|---|---|
| 10,746,887 B2 | 8/2020 | Hornman et al. | |
| 10,890,058 B2 | 1/2021 | Krueger et al. | |
| 11,021,934 B2 | 6/2021 | Jin et al. | |
| 11,079,511 B2 | 8/2021 | Wu et al. | |
| 2014/0150523 A1 | 6/2014 | Stokely et al. | |
| 2015/0346370 A1 | 12/2015 | Martin et al. | |
| 2017/0235006 A1* | 8/2017 | Ellmauthaler | G01V 1/226 |
| | | | 702/6 |
| 2018/0231678 A1* | 8/2018 | Mateeva | G01H 9/004 |
| 2019/0004195 A1 | 1/2019 | Hornman et al. | |
| 2021/0382194 A1 | 12/2021 | Mukhtarov et al. | |
| 2021/0388716 A1 | 12/2021 | Cerrahoglu et al. | |
| 2022/0283330 A1* | 9/2022 | Willis | G01V 1/46 |

OTHER PUBLICATIONS

Li, Yingping & Wu, Han & Wong, W. & Hewett, B. & Liu, Z. & Mateeva, Albena & Lopez, Jorge. (2015). Velocity Analysis and Update with 3D DAS-VSP to Improve Borehole/Surface Seismic Images. 5285-5289. 10.1190/segam2015-5864923.1. (Year: 2015).*

Stewart, Robert R., Phil D. Huddleston, and Tze Kong Kan. "Seismic versus sonic velocities: A vertical seismic profiling study." Geophysics 49.8 (1984): 1153-1168 (Year: 1984).*

S. K. Bakku et al.; "Vertical Seismic Profiling Using Distributed Acoustic Sensing in a Hydrofrac Treatment Well", SEG Technical Program Expanded Abstracts 2014; Aug. 5, 2014; pp. 1-5 (5 pages).

T.M. Daley et al.; "Field testing of modular borehole monitoring with simultaneous distributed acoustic sensing and geophone vertical seismic profiles at Citronelle, Alabama", Geophysical Prospecting; vol. 64; 2016; pp. 1318-1334 (17 pages).

T. Dean et al.; "Depth calibration of fibre-optic distributed vibration sensing measurements", First Break; vol. 36; Mar. 2018; pp. 29-34 (6 pages).

A. Ellmauthaler et al.; "Depth calibration for DAS VSP—Lessons learned from two field trials", SEG International Exposition and 86th Annual Meeting; 2016; pp. 632-636 (5 pages).

J.H. Kommedal and B.A. Tjøstheim; "A Study of Different Methods of Wavefield Separation for Application to VSP Data", Geophysical Prospecting; vol. 37; 1989; pp. 117-142 (26 pages).

V. Kazei et al.; "Inverting DAS data using energy conservation principles", Interpretation; vol. 9; Issue 4; 2020 (32 pages).

S. M. LaValle et al.; "On the Relationship Between Classical Grid Search and Probabilistic Roadmaps", The International Journal of Robotics Research; vol. 23; Issues 7-8; Aug. 2004; pp. 1-28 (28 pages).

K. N. Madsen et al.; "Data-driven depth calibration for distributed acoustic sensing", The Leading Edge; vol. 35; Issue 7; Jul. 1, 2016; pp. 610-614 (5 pages).

A. Mateeva and P. M. Zwartjes; "Depth Calibration of DAS VSP Channels: a New Data-Driven Method", 79th EAGE Conference & Exhibition 2017; Jun. 2017; pp. 1-5 (5 pages).

M. E. Willis et al.; "Quantitative quality of distributed acoustic sensing vertical seismic profile data", The Leading Edge; vol. 35; Issue 7; Jul. 2016; pp. 605-609 (5 pages).

M.E. Willis et al.; "Calibration of Distributed Acoustic Sensing (DAS) VSP Data", 78th EAGE Conference & Exhibition; 2016; pp. 1-5 (5 pages).

International Search Report issued for corresponding international patent application No. PCT/US2024/034988, mailed Oct. 4, 2024 (6 pages).

Written Opinion issued for corresponding international patent application No. PCT/US2024/034988, mailed Oct. 4, 2024 (7 pages).

* cited by examiner

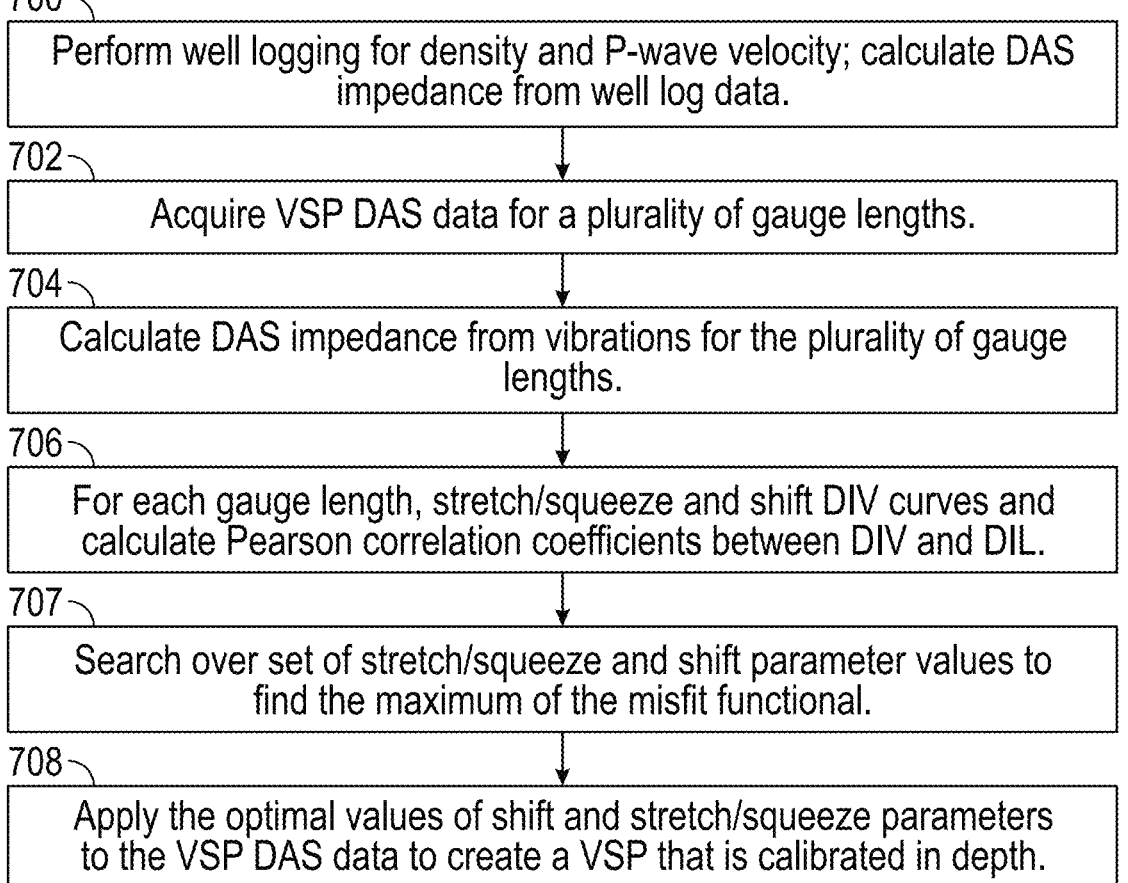

700 — Perform well logging for density and P-wave velocity; calculate DAS impedance from well log data.

702 — Acquire VSP DAS data for a plurality of gauge lengths.

704 — Calculate DAS impedance from vibrations for the plurality of gauge lengths.

706 — For each gauge length, stretch/squeeze and shift DIV curves and calculate Pearson correlation coefficients between DIV and DIL.

707 — Search over set of stretch/squeeze and shift parameter values to find the maximum of the misfit functional.

708 — Apply the optimal values of shift and stretch/squeeze parameters to the VSP DAS data to create a VSP that is calibrated in depth.

FIG. 7

DAS DEPTH CALIBRATION WITH MULTI-GAUGE LENGTH INTERROGATION

BACKGROUND

Distributed acoustic sensing (DAS) is a method for recording seismic data involving an interrogator device that constantly sends light pulses through a fiber-optic cable and records backscattered signals. The backscattering occurs along the cable and can be analyzed to record a seismic wavefield impinging upon it.

Vertical seismic profiling (VSP) is a useful application of DAS to seismic data acquisition. Depth calibration is essential for VSP with DAS and allows for the localization of observed perturbations in the fiber-optic cable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments are disclosed related to methods for determining a calibrated vertical seismic profile (VSP) with a distributed acoustic sensing (DAS) system in a borehole. The methods include obtaining a density log and an acoustic slowness log for the borehole; determining a first impedance, a DAS impedance from well log (DIL) curve, from the density log and the acoustic slowness log; obtaining a VSP dataset in the borehole; for each of the plurality of gauge lengths: determining a second impedance, a DAS from vibrations (DIV) curve, from a VSP dataset for the plurality of gauge lengths, and determining a fit between the DIV curves and the DIL curve by using a misfit functional for each of a plurality of depth adjustments. The methods further include determining the calibrated VSP by applying a preferred depth adjustment to the VSP dataset.

In general, in one aspect, embodiments are disclosed related to a non-transitory computer-readable memory comprising computer-executable instructions stored thereon that, when executed on a processor, cause the processor to perform the steps for determining a calibrated vertical seismic profile (VSP) with a distributed acoustic sensing (DAS) system in a borehole. The steps include receiving a density log and an acoustic slowness log for a borehole; determining a first impedance, a DAS impedance from well log (DIL) curve, from the density log and the acoustic slowness log; for each of a plurality of gauge lengths: determining a second impedance, a DAS from vibrations (DIV) curve, from a VSP dataset for the plurality of gauge lengths, and determining a fit between the DIV curves and the DIL curve by using a misfit functional for each of a plurality of depth adjustments. The steps further include selecting a preferred depth adjustment based, at least in part, on the misfit functional; and determining a calibrated VSP by applying the preferred depth adjustment to the VSP dataset.

In general, in one aspect, embodiments are disclosed related to systems configured for determining a calibrated vertical seismic profile (VSP) with a distributed acoustic sensing (DAS) system in a borehole. The systems include a logging system, configured to obtain a density log and an acoustic slowness log for a borehole; a DAS system, configured to record seismic data from a vertical seismic profiling (VSP) experiment with a seismic source for a plurality of gauge lengths in the borehole; and a VSP processing system, configured to determine a first impedance, a DAS impedance from well log (DIL) curve, from the density log and the acoustic slowness log and, for each of the plurality of gauge lengths the systems are further configured to determine a second impedance, a DAS from vibrations (DIV) curve, from a VSP dataset for the plurality of gauge lengths, and determine a fit between the DIV curves and the DIL curve by using a misfit functional for each of a plurality of depth adjustments. The VSP processing system is further configured to select a preferred depth adjustment based, at least in part, on the misfit functional, and determine a calibrated VSP dataset by applying the preferred depth adjustment to the VSP dataset. The systems further include a seismic processing system configured to form a seismic image based, at least in part, on the calibrated VSP dataset obtained by the DAS system.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 7 shows a workflow in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to a system and a method for vertical seismic profiling (VSP) with a DAS system. A fiber-optic cable can be subdivided into DAS receiver channels (corresponding, for instance, to VSP receiver levels) based on the time of travel of a light pulse sent along it by an interrogator. However, pinpointing the exact physical depth of a DAS receiver channel with respect to geology is not trivial and requires calibration of the optical depths versus depths in the borehole. Multi-gauge length measurements are obtained with the same interrogator; stretches/squeezes and shifts are applied to the measured DAS data to maximize the correlation with well log data.

The key innovations introduced by way of embodiments disclosed herein are the following:

a. A DAS impedance extraction procedure from seismic data that allows for direct comparison with "ground truth" well log data.

b. A procedure for shifting and stretching/squeezing the DAS seismic data to align the produced DAS impedance with well data through the maximization of a misfit functional.

Figure 1:
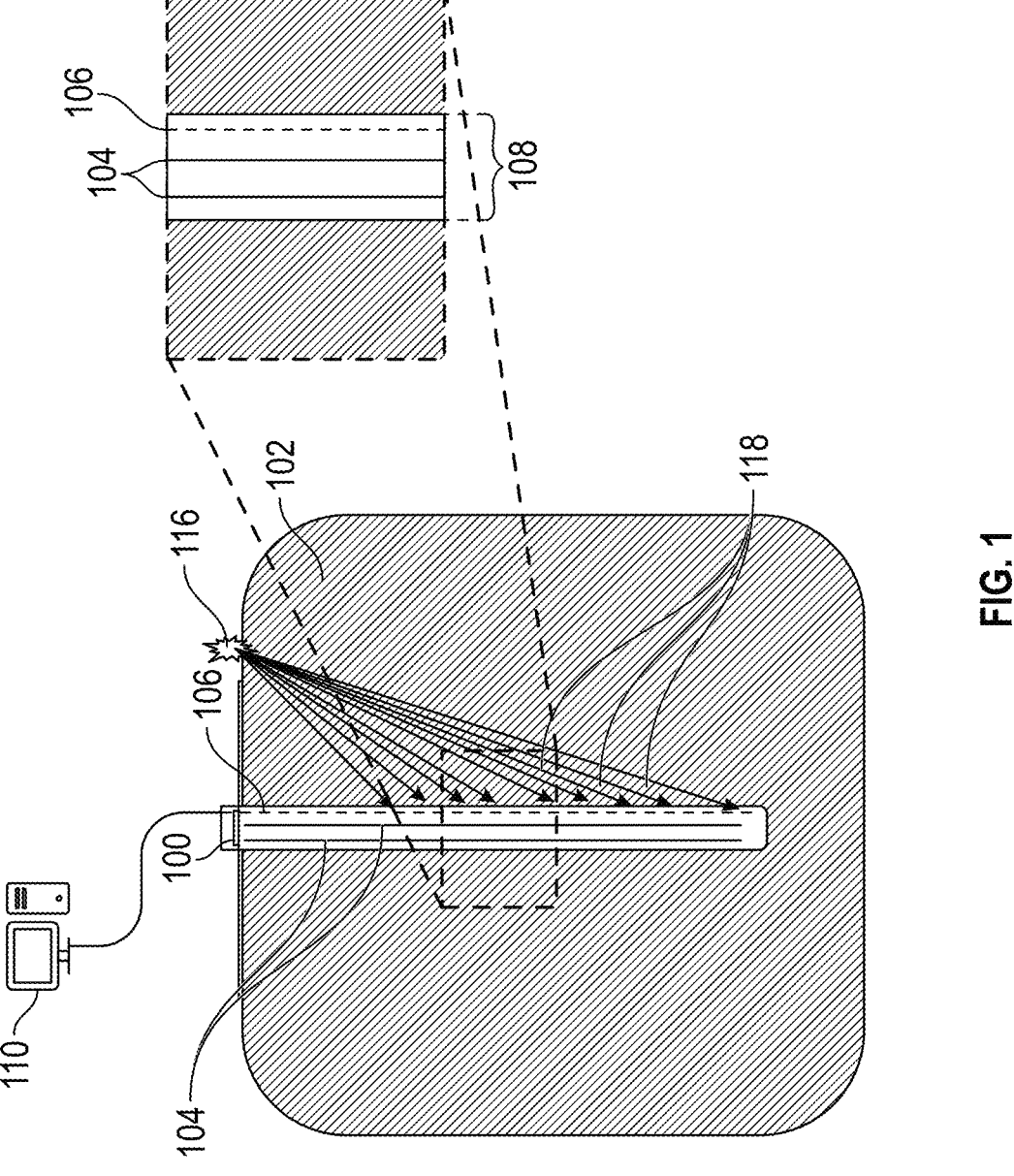
FIG. 1 shows a well with casing and a fiber-optic cable and a seismic shot according to one or more embodiments.

FIG. 1 illustrates systems in accordance with one or more embodiments. Specifically, FIG. 1 shows a well (100) that may be drilled in the subsurface (102). The borehole (108) corresponds to the uncased portion of the well (100). Casing (104) is pipe lowered into a borehole (108) designed to resist compressive and tensile stresses in the subsurface (102). A fiber-optic cable (106) may be installed within the borehole (108) of the well (100). A particular way of installing the fiber-optic cable (106) does not limit the scope of the invention; different types of fiber-optic cable (106) installations can be used, such as cementing the fiber behind the steel casing (104), installing it on production tubing, or placing the fiber inside the borehole (108). Fiber-optic cables (106) are widely used for sensor data transmission in various domains. Sensors may be directly connected to the fiber-optic cable (106) and generate optical signals that transmit sensor measurements through the fiber. When used in this way, the measurements obtained by the sensors are modulated onto a carrier wave of light and transmitted through the fiber-optic cable (106) to a receiver that decodes the signals. Another way to obtain information with a fiber-optic cable (106) is to use the cable itself as a sensor.

With this technology, a special device known as an interrogator (110) is connected to one end of the fiber-optic cable (106). The interrogator (110) generates light pulses from a laser source that travel down the length of the fiber-optic cable (106), emitting backscattered signals before being reflected back to the interrogator (110) from the end of the fiber-optic cable (106). A distributed acoustic sensing (DAS) system includes the fiber-optic cable (106) along with the interrogator (110) and records an acoustic wavefield over time using the installed fiber-optic cable (106). The recorded data is transmitted to the surface as a modulated light wave, where it can be demodulated by the interrogator (110) to obtain the original measurements or recordings of the acoustic wavefield.

Rayleigh backscattering is one type of scattering that occurs when locations throughout the fiber-optic cable (106) scatters the input light signals back to the interrogator (110). The interrogator (110) measures changes in the phase, wavelength, and intensity of the backscattered light signals. Changes in wavelength may be used to measure changes in temperature in the fiber-optic cable (106). Changes in intensity may be used to detect changes in strain. Changes in the phase of backscattered light signals may be indicative of strain in the fiber-optic cable (106). Continuously measuring the change in strain throughout the fiber-optic cable (106) may allow it to be used as a detector of acoustic signals impinging upon it.

Other scattering effects may also be used to obtain data from a fiber-optic cable (106). For example, Brillouin scattering occurs when acoustic phonons traveling within the fiber-optic cable (106) interact with the input light signal. The backscattered signals from Brillouin scattering are much weaker than those from Rayleigh backscattering and require summing multiple backscattered signals related to the same event to obtain an accurate measurement. This limits applicability of the method to frequencies up to a few tens of Hertz. However, Brillouin scattering allows for measurements of the absolute value of temperature—something that Rayleigh scattering cannot do. Raman backscattering occurs when light is scattered at the molecular spatial scale. Raman backscattered signals are even weaker than those from Brillouin scattering and require summing signals over many seconds. This limits the applicability of this technique solely to measuring the absolute value of temperature.

A fiber-optic cable (106) may be of a conventional type, which always has intrinsic backscattering, or the fiber-optic cable (106) may be engineered in a specific way, for example, with Bragg gratings (capable of selectively reflecting and transmitting certain wavelengths of light). The fiber-optic cable (106) can be straight or shaped in various manners, e.g., helical. Embedding the fiber-optic cable (106) within the casing (104) of a well (100) allows it to be used as a permanent downhole sensor for continuous measurement of acoustic signals and other physical properties (e.g., temperature, pressure, and strain) within the borehole (108).

A DAS system is a linear sensor rather than a point sensor (such as a geophone). In other words, each data value obtained from a DAS system represent an integral over a certain portion of the fiber-optic cable (106). The "gauge length" is the parameter of the DAS interrogator (110) system that determines the length of the fiber segment over which the strain is averaged during each measurement. In general, increasing the gauge length improves the signal-to-noise ratio (S/N) in the data at the expense of resolution. Currently, gauge length varies in the range of 2-20 m for most commercially available systems.

A seismic source (116) may be activated on the surface to cause seismic waves (118) to impinge upon the fiber-optic cable (106). The seismic source may be, without limitation, a vibrator truck, a weight drop, or an air gun. Borehole (108) seismic datasets may be recorded by the DAS system through a VSP or a check-shot survey. Both VSPs and check-shot surveys may be used to determine the one-way seismic travel-time ("one-way time") between the surface and the different sections of the fiber-optic cable (106).

Figure 2:
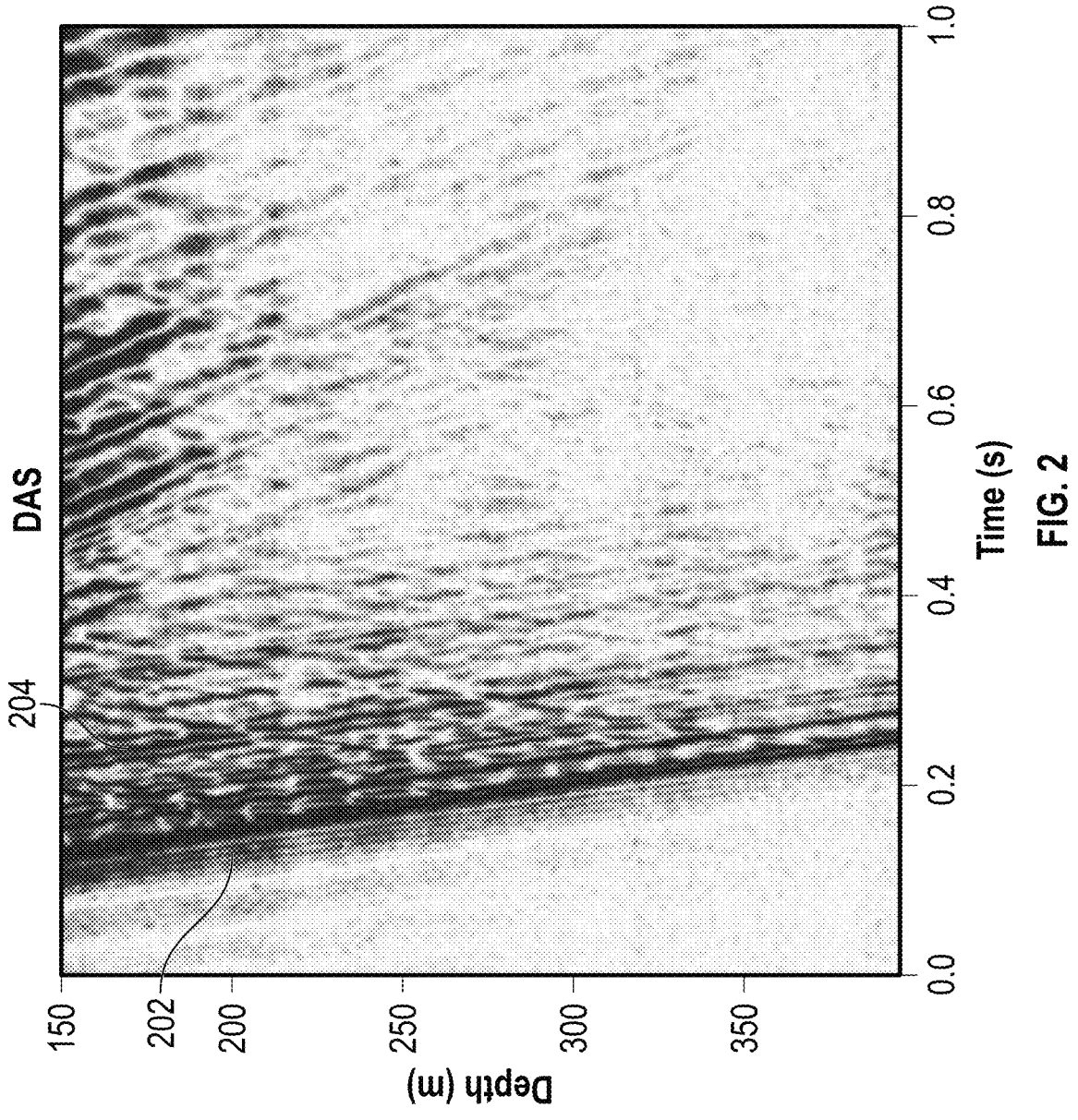
FIG. 2 shows data collected by a DAS system in accordance with one or more embodiments.

FIG. 2 shows a borehole (108) seismic dataset recorded with a DAS system using a fixed gauge length of 4 meters in accordance with one or more embodiments. A similar seismic dataset will exist for each gauge length used by the interrogator (110) to generate measurements. Waveforms are shown by the variations in color as a function of time, indicated on the horizontal axis, and represent variations of strain caused by seismic waves impinging on the fiber-optic cable (106). The fiber-optic cable (106) depth is indicated on the vertical axis. The one-way time from the surface to depth location in the fiber-optic cable (106) may be determined based on the first-break time of the waveform. The first-break time is the earliest arrival of propagated energy from the seismic source (116) to the fiber-optic cable (106) and may be characterized as the first indication of seismic energy on a seismic trace. Both downgoing (202) and upgoing (204) waves can be observed in the data (evidenced by opposite slopes).

The DAS measurements seen in FIG. 2 exhibit high spatial resolution of the earth vibrations, yet, in contrast to seismic data recorded by conventional geophones, the exact location in depth where the fiber vibrations occurred is not certain; backscattered signals may be affected by other external conditions around the fiber-optic cable (106), such as temperature, in addition to the impinging seismic waves. In order to better locate the depth where vibrations occur in the fiber-optic cable (106), embodiments disclosed herein propose determining a physical quantity known as "DAS impedance" which directly relates the DAS data to physical properties of the subsurface (102) and controls the amplitudes of the DAS seismic measurements. The theory upon which DAS impedance is based proceeds as follows:

The energy flux through an elastic medium may be represented as $$S = -\rho V_P^2 U_z^2 U_t, \qquad 1$$

where $\rho$ is density, $V_P$ is P-wave velocity, and $U_z$ is the spatial derivative of displacement, i.e., the strain, and $U_t$ is the temporal derivative of displacement, i.e., the particle velocity. The one-way one-dimensional wave equation, $$U_t = V_P U_z, \qquad 2$$

provides a relationship between particle velocity, $U_t$, and strain, $U_z$, and may be used to model first arrivals of seismic waves in a subsurface (102) medium (but not multiple scattering). Equation 2 may be substituted into equation 1 to obtain the "P-flux"

$$W = \rho V_P^3 U_z^2. \qquad 3$$

Energy conservation in a medium under the assumption of no scattering implies that the integral of equation 3 over time is constant:

$$\int_0^{+\infty} W \, dt = \rho(z) V_P^3(z) \int_0^{+\infty} U_z^2 dt = \text{Constant}(z). \qquad 4$$

Equation 4 states that the amount of energy propagating through each point in depth, z, is constant. The quantity $$\rho(z) V_P^3(z)$$

is the DAS impedance—it is given this name due to its similarity with conventional acoustic impedance, $\rho(z)V_P(z)$.

Although the assumption of no wave scattering in equations 2 and 4 is violated, it is a reasonable approximation given that the proportion of energy transmitted through the subsurface (102) medium is much greater than the amount that is reflected.

Assuming that it is possible to separate the total wavefield into upgoing and downgoing portions, the total energy, E, associated with the total wavefield may also be separated into upgoing, $E^{\uparrow}$ and downgoing, $E^{\downarrow}$, portions. The energy flux also is equal to the energy multiplied by the propagation velocity of seismic waves, giving the relationship:

$$\langle E^{\uparrow} - E^{\downarrow} \rangle_t V_P(z) = \text{constant}(z), \qquad 5$$

where $\langle \ \rangle_t$ denotes averaging over a single period. This expression further reduces to an expression containing only the potential energy:

$$\langle E_p^{\uparrow} - E_p^{\downarrow} \rangle_t V_P(z) = \text{constant}(z), \qquad 6$$

where $$E_P^{\uparrow} \text{ and } E_P^{\downarrow}$$

denote the potential energy of upgoing (204) and downgoing (202) waves, respectively. Potential energy is defined as $$E_p = \frac{1}{2}\rho V_P^2 U_z^2. \qquad 7$$

Plugging equation 7 into equation 6 gives $$\rho(z) V_P^3(z) \left( \langle \left( U_z^{\downarrow}(z, t) \right)^2 \rangle_t - \langle \left( U_z^{\uparrow}(z, t) \right)^2 \rangle_t \right) = \qquad 8$$
$$\rho(z) V_P^3(z) \left( \| U_z^{\downarrow}(z, t) \|_2^2 - \| U_z^{\uparrow}(z, t) \|_2^2 \right) = \text{constant}(z),$$

where $$U_z^{\downarrow}$$

is the downgoing (202) wavefield and $$U_z^{\uparrow}$$

is the upgoing (204) wavefield.

If the constant(z) term can be evaluated, Equation 8 provides a way to calculate the DAS impedance from observed DAS waveforms. Calculating the value of this term first requires a single value of the DAS impedance (say, at the first depth location, $z_0$); this may be determined from well log data. Alternatively, the value may be tied to a certain location in the subsurface (102) with a known geologic structure (i.e., taken from neighboring wells). Next, the $$\| U_z^{\downarrow}(z_0, t) \|_2^2 - \| U_z^{\uparrow}(z_0, t) \|_2^2$$

term requires separating the downgoing (202) and upgoing (204) wavefields, calculating the RMS energy over the time axis for $$U_z^\downarrow \text{ and } U_z^\uparrow$$

at $z_0$, and then calculating the difference between the two wavefields. In one embodiment, the separation of the upgoing and downgoing wavefields may be accomplished by an f-k transform followed by filtering and back transformation.

Plugging the constant(z) term into equation 8 results in the following equation, which allows DAS impedance to be calculated at each depth of the fiber-optic cable (106):

$$\rho(z)V_P^3(z) = \rho(z_0)V_P^3(z_0)\frac{(\|U_z^\downarrow(z_0, t)\|_2^2 - \|U_z^\uparrow(z_0, t)\|_2^2)}{(\|U_z^\downarrow(z, t)\|_2^2 - \|U_z^\uparrow(z, t)\|_2^2)}. \quad 9$$

DAS impedance obtained through application of equation 9 to the data will be referred to as "DAS impedance from vibrations" (DIV).

Figure 3:
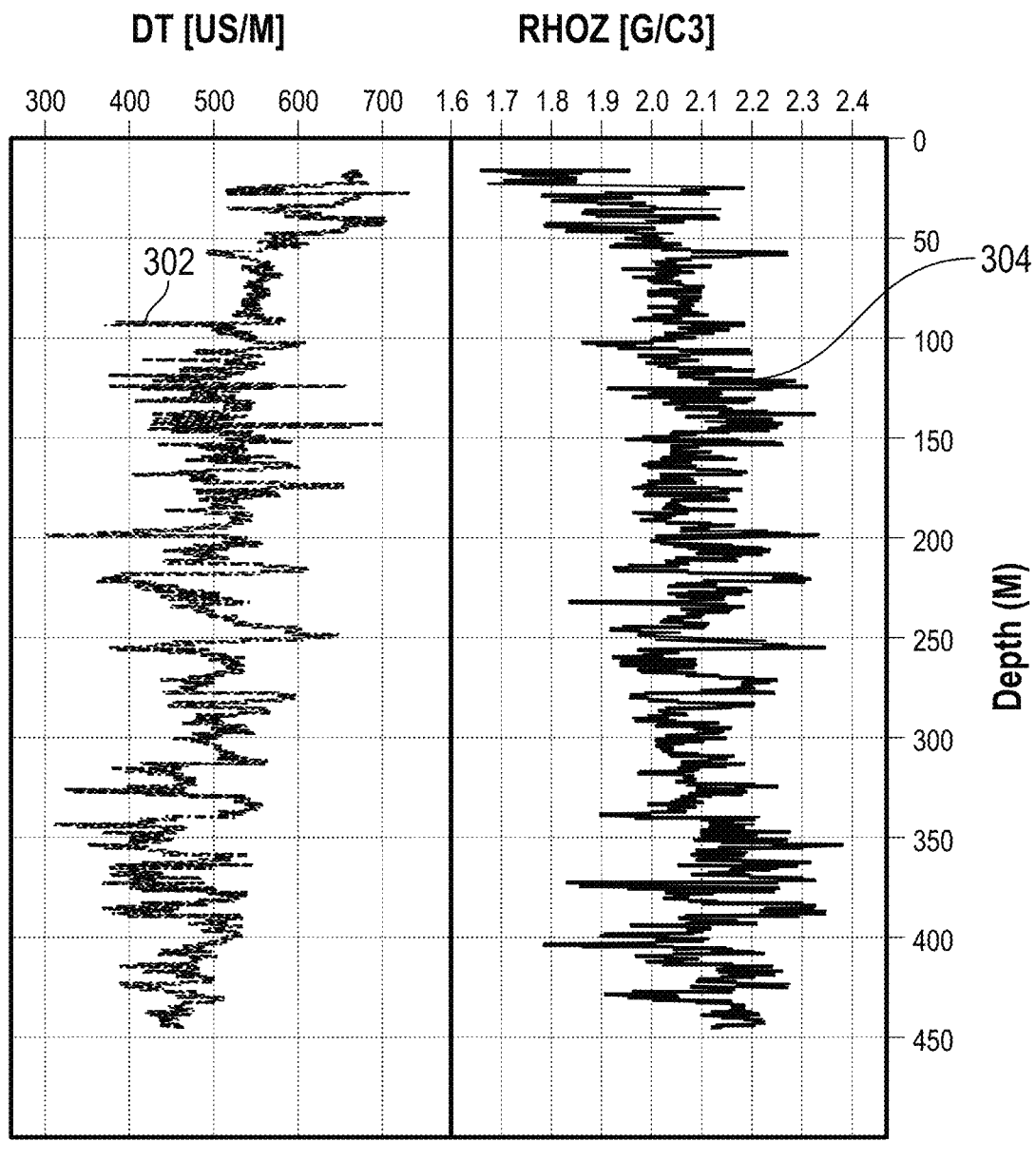
FIG. 3 shows well logs of slowness and density in accordance with one or more embodiments.

FIG. 3 shows measurements of slowness (302) and the density (304) of rock formations as a function of depth obtained from a well-logging tool in the same borehole (108) that contains the fiber-optic cable (106). The values of slowness and density are both obtained at common locations in the well log. Well logging tools may be suspended from a wireline cable that is lowered into the borehole (108) to obtain measurements. Slowness (302) is measured using a sonic tool that consists of at least one transmitter and at least one receiver. The transmitter emits sound waves which travel through the rock formation surrounding the borehole (108) before being recorded by a receiver. The travel-time from the source (i.e., the transmitter) represents the slowness (302), which is the reciprocal of P-wave velocity, and is usually expressed in units of microseconds/ft or microseconds/meter. The velocity and density (304) from the well log may be combined according to $$\rho(z)V_P^3(z)$$

to produce a DAS impedance at each depth location where logging was performed. When a well logging tool is deployed into a borehole (108), the length of cable unspooled may be monitored, thus the depth of each of the well logging measurements will be known at any time with a high level of certainty. As such, the DAS impedance obtained from the well log data shown in FIG. 3 and the associated depth values may be treated as "ground truth" for comparison with the DIV obtained through the equation 9. DAS impedance obtained from the well logs will be referred to as "DAS impedance from logs" (DIL).

Figure 4:
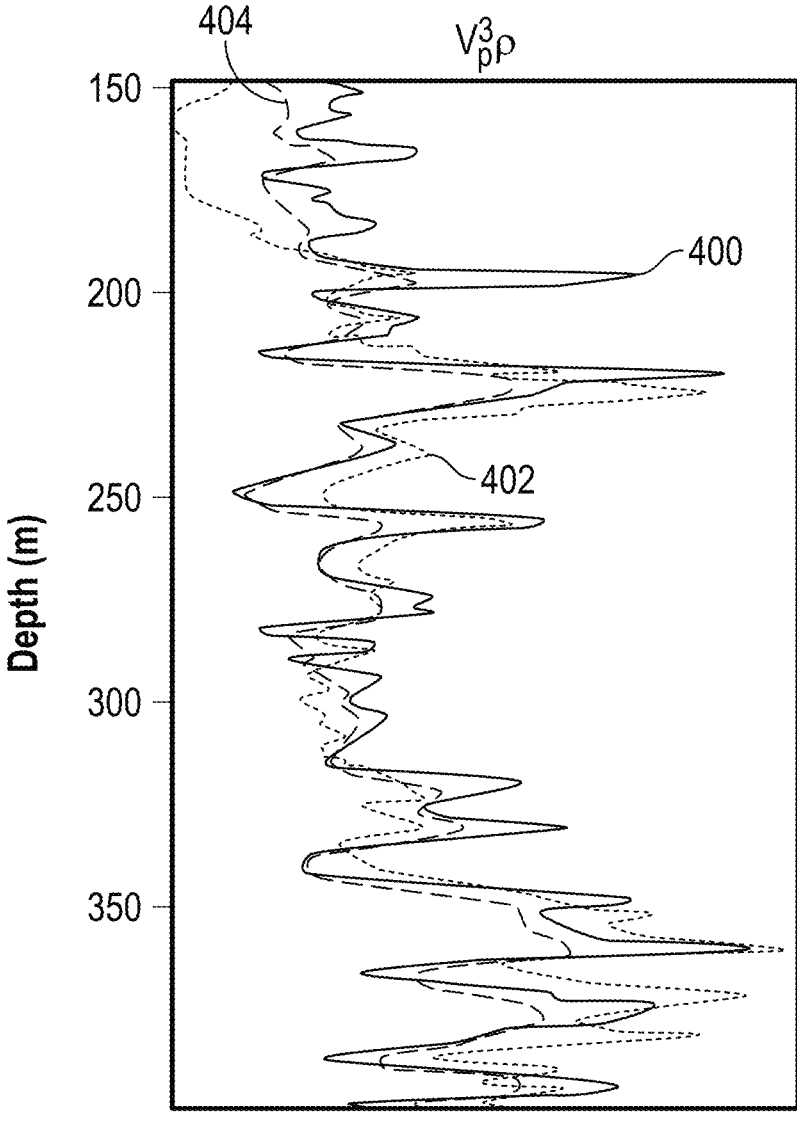
FIG. 4 shows DAS impedance in accordance with one or more embodiments.

FIG. 4 shows the results of calculating DAS impedance through various means. The black curve (400) represents an upscaling of the ground-truth DIL obtained from the well log data. The red curve (402) represents the DIV from equation 9. The blue curve (404) represents using the values of DIV obtained from equation 9 applied to a synthetic 1-D seismic data set created with a wave simulation program using the velocity and density (304) values from the well logs.

Although all three curves bear close similarities, the blue curve (404) resembles the ground truth to a higher degree than the red curve (402).

Varying the gauge length of the DAS interrogator (110) as well as shifting the depth axis may improve the fit of the DIV to the DIL. Therefore, a seismic data set is produced for a range of gauge lengths and DIV is produced for each seismic dataset. Each DIV may then be shifted in depth and a correlation coefficient may be calculated between it and the DIL. Furthermore, the depth axis may be stretched/squeezed and another correlation coefficient calculated for each stretch/squeeze value. In this way, depth adjustments, including a shift and a stretch/squeeze factor, may be applied to the seismic datasets from the different gauge lengths to find the DIV that optimally correlates with the DIL. Shifting involves adding or subtracting a bulk value to the depth axis of the DIV. Stretching involves multiplying the depth values of the DIV by a factor larger or smaller than one. This procedure represents an innovation of this invention over prior art.

Figure 5:
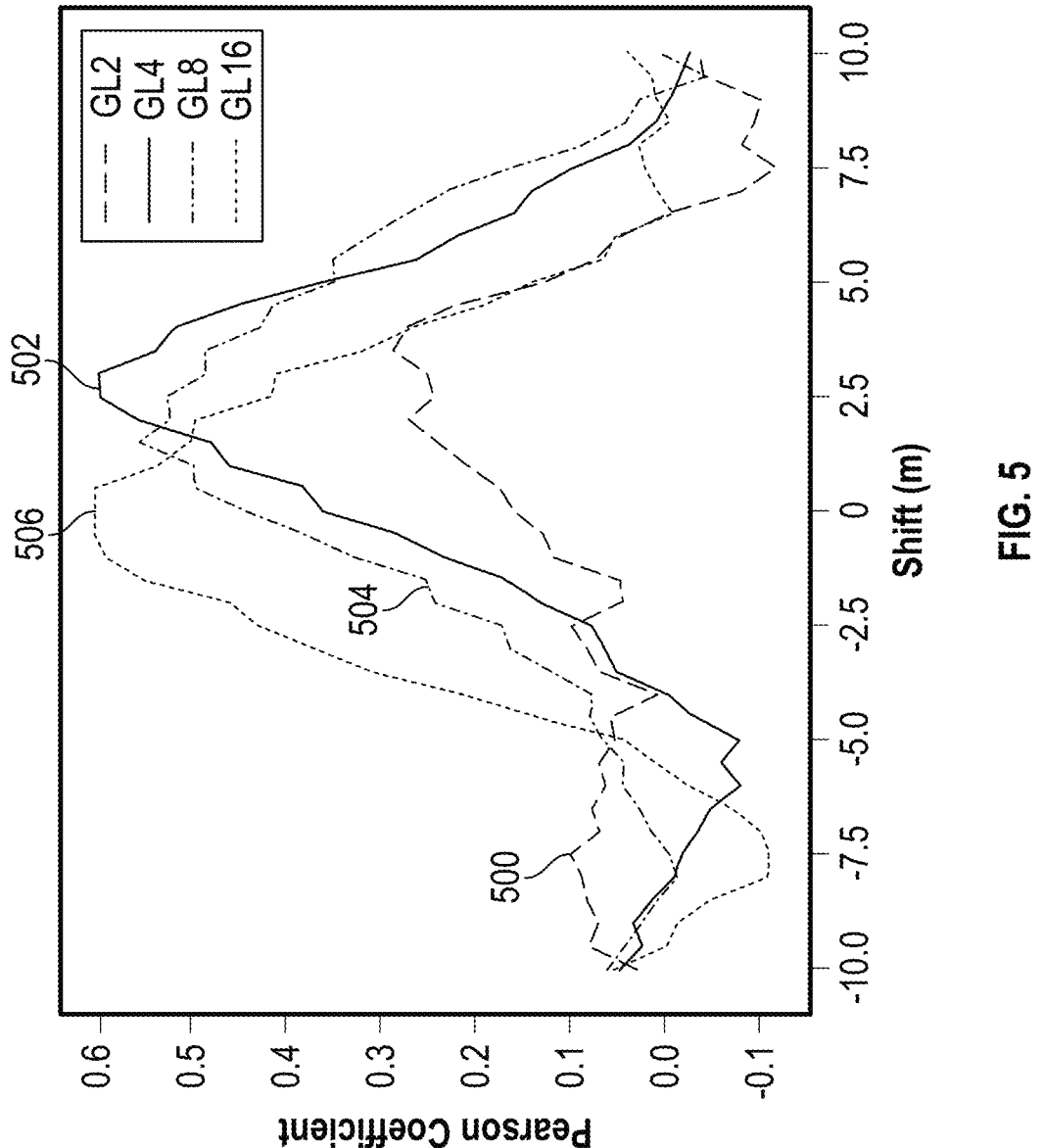
FIG. 5 shows Pearson correlation coefficients as a function of spatial shift for different gauge lengths in accordance with one or more embodiments.
Figure 6:
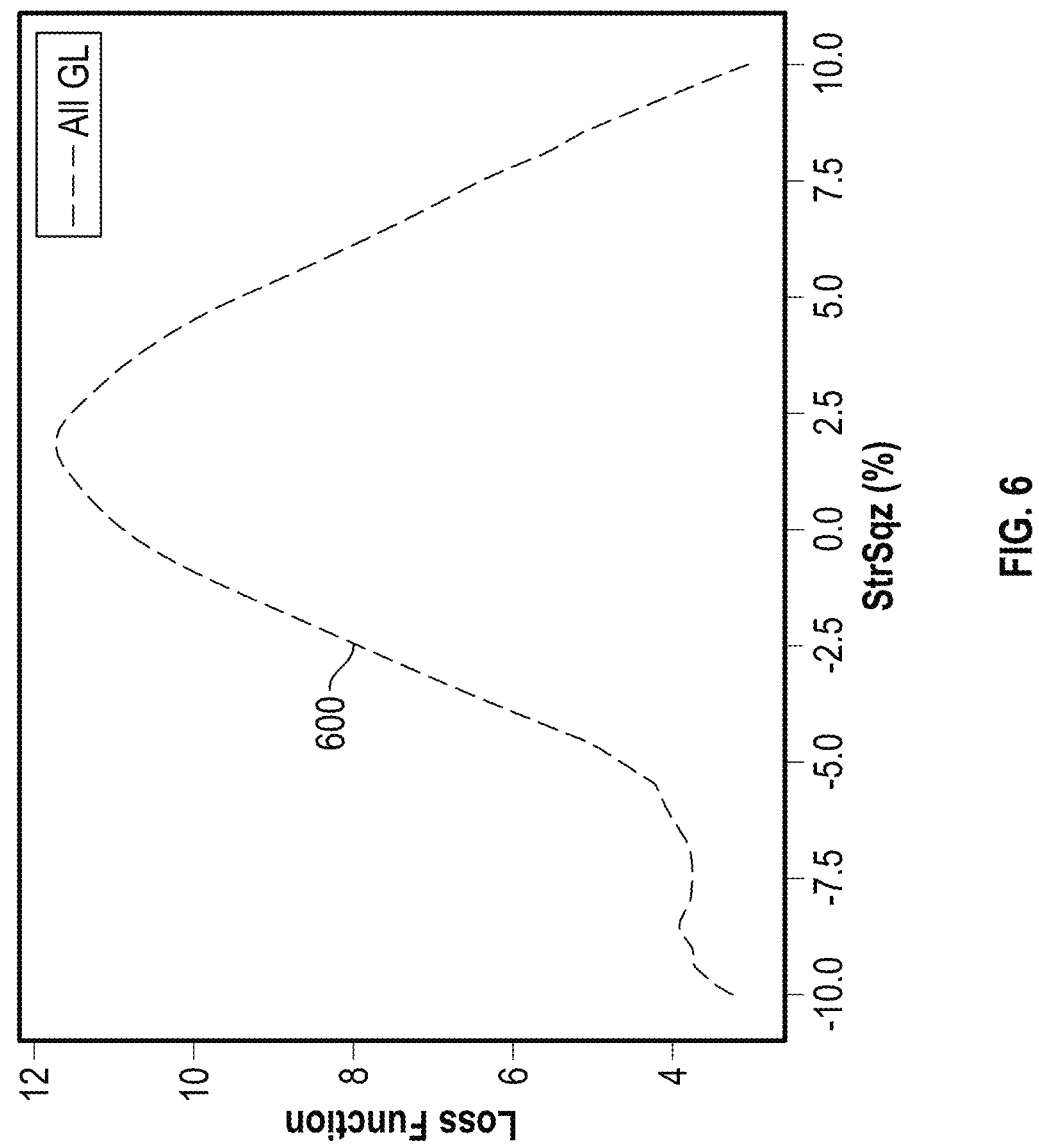
FIG. 6 shows the weighted sum of Pearson correlation coefficients (several per gauge length) as a function of stretch/squeeze in accordance with one or more embodiments.

FIG. 5 shows curves of Pearson correlation coefficients between the DIV and the DIL for different bulk shifts for several different gauge lengths ranging from 2 to 16 meters (500, 502, 504, 506). FIG. 6 shows a curve (600) of the weighted sum of Pearson correlation coefficients for several experiments between the DIV and DIL for a range of different stretch/squeeze factors.

In order to determine the optimal shift and stretch/squeeze parameters, a misfit functional is defined:

$$L(\text{stretch,shift}_1,\text{shift}_2 \ldots) = \Sigma_i w_i \times CC(\text{DIL,DIV}_i(\text{stretch,shift}_i)).$$

The DIV is indexed by a subscript, i, referencing each of a number of possible gauge lengths. For each gauge length, the shift parameter is varied. Separately, the stretch parameter is varied across all gauge lengths. $w_i$ are weighting factors which, for the results presented here, were set identically to 1. The shift and stretch/squeeze parameter values that maximize this functional represent the optimal values for aligning the DIV with the DIL, and thus determining the depth location in the fiber-optic cable (106) where the vibrations observed in the seismic data occurred.

The functional L is maximized using a global or local optimization method over the possible combinations of stretch and shift parameters. Due to small dimensionality of the parameter space to be searched and the computationally cheap evaluations based on 1D function-comparing, a brute-force global grid search may be used as the default optimization strategy. Upon obtaining the values of the stretch and shift parameters that maximize L (which may be considered the preferred depth adjustment parameters), values of DIV may be determined that optimally aligns with the DIL.

FIG. 7 presents a workflow for embodiments disclosed herein. In Step 700, well logging is performed in a borehole (108). A sonic tool is used to obtain slowness (302) values, and a gamma-ray tool is used to obtain values of density (304). Velocity is calculated at each depth point by taking the inverse of the slowness (302). The DIL is then calculated by multiplying the density (304) times the velocity to the third power:

$$\rho(z)V_P^3(z).$$

Using a fiber-optic cable (106) installed in the well (100), in Step 702, VSP DAS data is acquired by triggering a seismic source on the earth's surface. An interrogator (110) records the seismic data in the form of backscattered light signals using different gauge lengths. In Step 704, DIV values are calculated from the DAS seismic data for each gauge length using equation 9 along with the DIL value at one depth point overlapping the fiber-optic cable (106).

In Step 706, for each gauge length, stretches/squeezes and shifts are applied to the DIV curves. For each stretch/squeeze and shift, Pearson correlation coefficients are calculated between the DIV and DIL. In Step 707, the values of the Pearson correlation coefficients are input into a misfit functional. A search is conducted for the values of stretch/squeeze and shift that maximize the misfit functional. Due to small dimensionality of the stretch/squeeze and shift parameter space (the number of gauge lengths plus one) and computationally cheap evaluations of the functional, a global brute-force grid search can be considered the default optimization strategy.

In Step 708, a calibrated VSP is created by using the values of stretch/squeeze and shift that maximize the misfit functional to correct the depth of the DAS seismic data. A correctly calibrated VSP may subsequently be used in seismic imaging to better delineate subsurface features. This, in turn, may allow a well planning system to plan a sidetrack borehole trajectory based, at least in part, on the seismic image. Once a sidetrack trajectory is determined, a drilling system may be used to create the sidetrack borehole guided by the sidetrack borehole trajectory.

Figure 8:
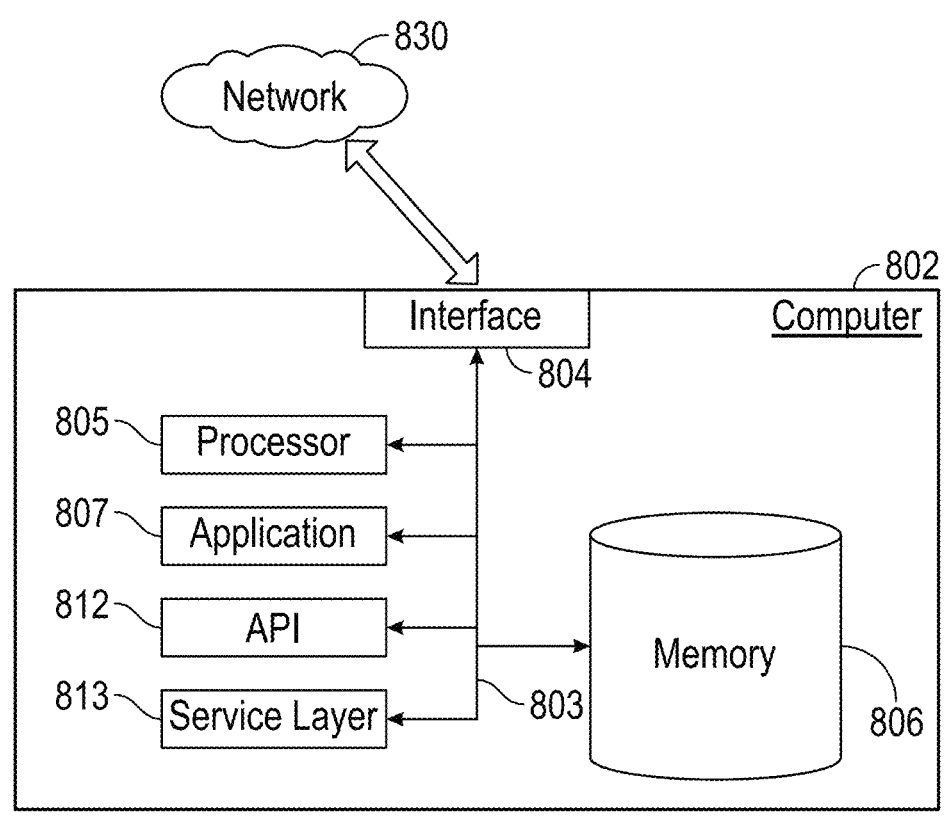
FIG. 8 shows a computer system in accordance with one or more embodiments.

FIG. 8 further depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and respond to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers. surface, a PLC 304, acoustic receivers (near and far) 306, and well positioning devices 308. FIG. 3 depicts the data collecting, processing and transmission route in real-time.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention.

What is claimed:

1. A method for determining a calibrated vertical seismic profile (VSP) with a distributed acoustic sensing (DAS) system in a borehole, comprising:

obtaining a density log and an acoustic slowness log for the borehole, wherein each log comprises a value recorded at a plurality of locations common to the density log and the acoustic slowness log;

determining a first impedance, a DAS impedance from well log (DIL) curve, from the density log and the acoustic slowness log;

obtaining a VSP dataset in the borehole, wherein the VSP dataset comprises a plurality of acoustic signals generated by a seismic source and recorded with the DAS system for a plurality of gauge lengths;

for each of the plurality of gauge lengths:

determining a second impedance, a DAS impedance from vibrations (DIV) curve, from the VSP dataset for the plurality of gauge lengths, and determining a fit between DIV curves and the DIL curve by using a misfit functional for each of a plurality of depth adjustments;

determining the calibrated VSP by applying a preferred depth adjustment to the VSP dataset;

forming, using a seismic processing system, a seismic image based, at least in part, on the calibrated VSP;

planning, using a well planning system, a sidetrack borehole trajectory based, at least in part, on the seismic image; and drilling, using a drilling system, a sidetrack borehole guided by the sidetrack borehole trajectory.

2. The method of claim 1, wherein the misfit functional comprises a plurality of correlation coefficients between the DIV curves and the DIL curve.

3. The method of claim 2, wherein the plurality of correlation coefficients comprise a Pearson correlation coefficient.

4. The method of claim 1, wherein determining each of the plurality of depth adjustments comprises determining a plurality of depth shifts.

5. The method of claim 1 further comprising:

selecting the preferred depth adjustment by determining a depth adjustment that maximizes the misfit functional.

6. The method of claim 1, wherein the DAS system comprises a fiber-optic cable coupled to a laser light source and to an optical interrogator, wherein the optical interrogator decodes a backscattered laser light from a plurality of locations along the fiber-optic cable.

7. The method of claim 6, wherein a gauge length comprises a length of a portion of the fiber-optic cable that determines one of the plurality of acoustic signals.

8. A system comprising:

a logging system configured to obtain a density log and an acoustic slowness log for a borehole;

a distributed acoustic sensing (DAS) system configured to record seismic data from a vertical seismic profiling (VSP) experiment with a seismic source for a plurality of gauge lengths in the borehole;

a VSP processing system configured to:

determine a first impedance, a DAS impedance from well log (DIL) curve, from the density log and the acoustic slowness log;

for each of the plurality of gauge lengths:

determine a second impedance, a DAS impedance from vibrations (DIV) curve, from a VSP dataset for the plurality of gauge lengths, and determine a fit between DIV curves and the DIL curve by using a misfit functional for each of a plurality of depth adjustments;

select a preferred depth adjustment based, at least in part, on the misfit functional;

determine a calibrated VSP dataset by applying the preferred depth adjustment to the VSP dataset;

a seismic processing system configured to form a seismic image based, at least in part, on the calibrated VSP dataset obtained by the DAS system;

a well planning system configured to plan a sidetrack borehole trajectory based, at least in part, on the seismic image; and a drilling system configured to drill a sidetrack borehole guided by the sidetrack borehole trajectory.

9. The system of claim 8, wherein the DAS system comprises a fiber-optic cable coupled to a laser source and an interrogator.

10. The system of claim 9, wherein the interrogator is configured to decode a backscattered laser light from a plurality of locations along the fiber-optic cable.

11. The system of claim 9, wherein the interrogator is configured to use a gauge length to measure a backscattered laser light from portions of the fiber-optic cable to determine a plurality acoustic signals.

\* \* \* \* \*